(12) United States Patent
Corry et al.

(10) Patent No.: US 8,597,385 B2
(45) Date of Patent: Dec. 3, 2013

(54) METHOD AND APPARATUS FOR SHIELDING COOLING TUBES IN A RADIANT SYNGAS COOLER

(75) Inventors: Judeth Brannon Corry, Houston, TX (US); James Michael Storey, Houston, TX (US)

(73) Assignee: General Electric Company, Schenectady, NY (US)

( * ) Notice: Subject to any disclaimer, the term of this patent is extended or adjusted under 35 U.S.C. 154(b) by 352 days.

(21) Appl. No.: 12/425,253

(22) Filed: Apr. 16, 2009

(65) Prior Publication Data

US 2010/0263841 A1    Oct. 21, 2010

(51) Int. Cl.
*F28F 13/00* (2006.01)

(52) U.S. Cl.
USPC .......................................... 48/127.9; 165/135

(58) Field of Classification Search
USPC ........................ 48/61–118.5, 127.9
See application file for complete search history.

(56) References Cited

U.S. PATENT DOCUMENTS

| | | | |
|---|---|---|---|
| 4,188,915 A * | 2/1980 | Kummel et al. | 122/6 A |
| 4,357,305 A * | 11/1982 | Loo | 422/241 |
| 4,872,345 A * | 10/1989 | Dicks | 73/597 |
| 7,509,808 B2 | 3/2009 | Storey et al. | |
| 2008/0034657 A1* | 2/2008 | Van Den Berg et al. | 48/62 R |
| 2008/0041572 A1* | 2/2008 | Wessel et al. | 165/157 |
| 2008/0141913 A1* | 6/2008 | Yows et al. | 110/336 |

FOREIGN PATENT DOCUMENTS

| | | |
|---|---|---|
| CN | 1127997 | 7/1996 |
| CN | 101220296 | 7/2008 |

OTHER PUBLICATIONS

China Office Action mailed May 6, 2013.

* cited by examiner

*Primary Examiner* — Imran Akram
(74) *Attorney, Agent, or Firm* — Fletcher Yoder P.C.

(57) ABSTRACT

Methods and a system for shielding cooling tubes in a radiant syngas cooler. The heat shields may prevent direct contact between heated syngas and the cooling tubes. The heat shield may be mounted to a header that also attaches to the cooling tubes. The heat shield may also be separated from the cooling tubes or, alternatively, the heat shield may be coated onto the cooling tubes. Furthermore, prolonged exposure to the heated syngas may corrode the heat shield.

12 Claims, 5 Drawing Sheets

METHOD AND APPARATUS FOR SHIELDING COOLING TUBES IN A RADIANT SYNGAS COOLER

BACKGROUND OF THE INVENTION

The subject matter disclosed herein relates to a heat shield for use with a radiant syngas cooler.

In general, integrated gasification combined cycle (IGCC) power plants are capable of generating energy from various hydrocarbon feedstock, such as coal, relatively cleanly and efficiently. IGCC technology may convert the hydrocarbon feedstock into a gas mixture of carbon monoxide (CO) and hydrogen ($H_2$), i.e., syngas, by reaction with steam in a gasifier. These gases may be cleaned, processed, and utilized as fuel in a conventional combined cycle power plant. For example, the syngas may be fed into a combustor of a gas turbine of the IGCC power plant and ignited to power the gas turbine for use in the generation of electricity. Coal gasification processes may utilize compressed air or oxygen to react with the coal to form the CO and $H_2$. These processes may take place at relatively high pressures and temperatures and may be more efficient at design point conditions. Cooling the hot syngas may be beneficial, for example, to aid in maintaining the stability of the syngas during transmission of the syngas from the gasifier to the gas turbine of the IGCC. However, heat exchangers exposed to the hot syngas may be damaged, and even destroyed due to exposure to the hot syngas.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification cooling system comprising a heat exchanger comprising a coolant circuit and a gas passage, wherein the gas passage comprises an inlet, an outlet, and an expanded portion between the inlet and the outlet, and the coolant circuit comprises coolant tubes disposed along the gas passage between the inlet and the outlet, and a heat shield disposed in the gas passage between a central gas flow region and an inner wall housing the coolant tubes of the coolant circuit.

In a second embodiment, a system includes a heat shield configured to shield one or more cooling tubes in a syngas cooler from direct exposure to a heated flow of syngas from a gasifier.

In a third embodiment, a method includes gasifying a feedstock to produce a heated fluid, transmitting the heated fluid to a syngas cooler, exposing the heated fluid to a heat exchangers having a cooling circuit, and thermally shielding the cooling circuit from direct exposure to the heated fluid.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments are directed to shielding cooling tubes in a radiant syngas cooler. The cooling tubes may encounter heated syngas that may damage the cooling tubes. Over time, deposits may accumulate on the tubing to shield the tubing from the damaging temperatures of the syngas, but during the accumulation of these deposits, the tubing may be damaged. Accordingly, one or more heat shields may be utilized to protect the tubing from high heat flux associated with the heated syngas. For example, the heat shield may include an annular shield disposed between the cooling tubes and the primary flow path of the hot syngas. The heat shields may protect the tubing until the deposits may form on the tubing, at which time, the heat shields may fully corrode. By further example, the heat shield may include a heat shield coating applied directly to the cooling tubes.

Figure 1:
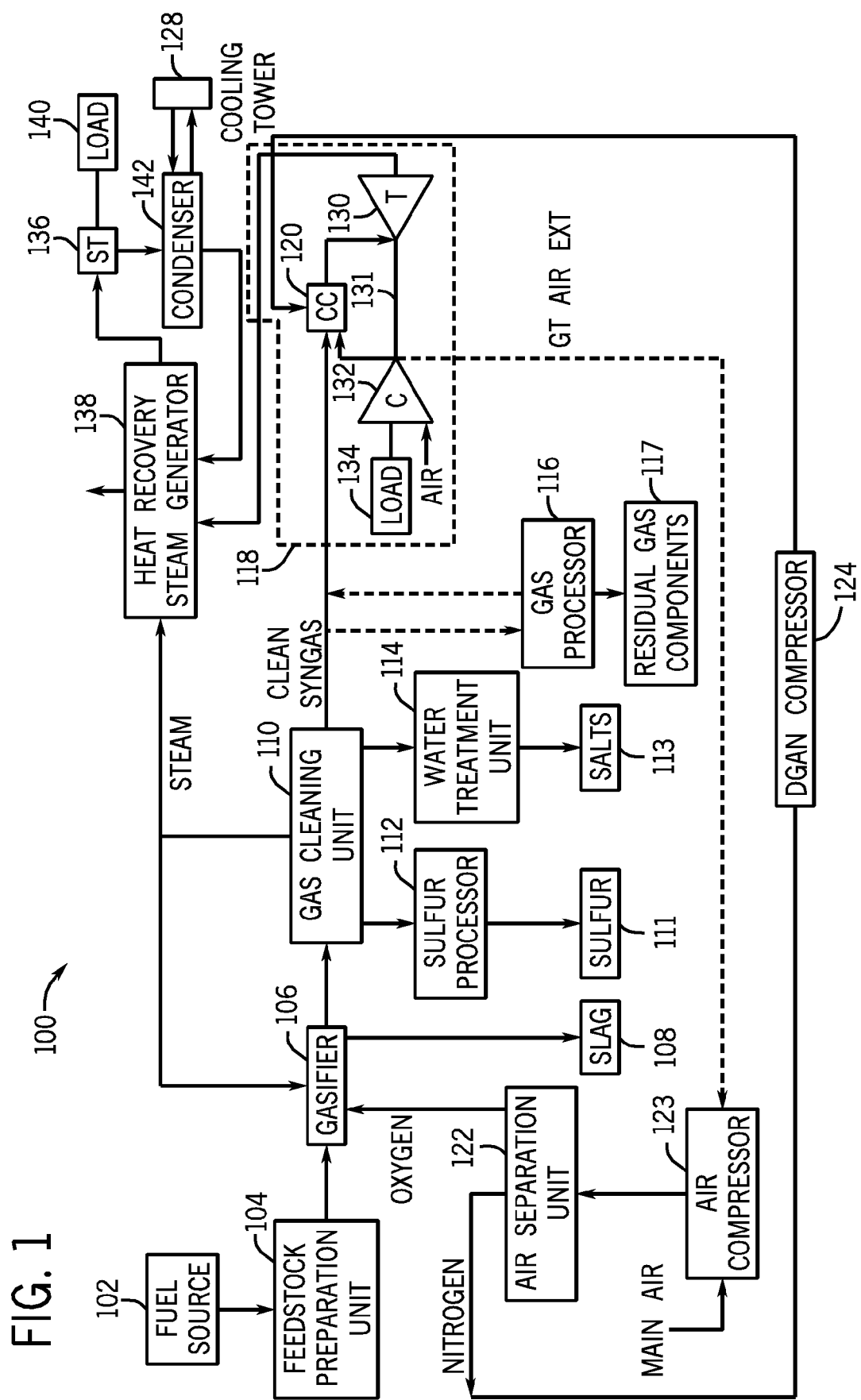
FIG. 1 a schematic block diagram of an embodiment of an integrated gasification combined cycle (IGCC) power plant.

FIG. 1 is a diagram of an embodiment of an integrated gasification combined cycle (IGCC) system 100 that may be powered by synthetic gas, i.e., syngas. Elements of the IGCC system 100 may include a fuel source 102, such as a solid feed, that may be utilized as a source of energy for the IGCC. The fuel source 102 may include coal, petroleum coke, biomass, wood-based materials, agricultural wastes, tars, coke oven gas and asphalt, or other carbon containing items.

The solid fuel of the fuel source 102 may be passed to a feedstock preparation unit 104. The feedstock preparation unit 104 may, for example, resize or reshaped the fuel source 102 by chopping, milling, shredding, pulverizing, briquetting, or palletizing the fuel source 102 to generate feedstock.

Additionally, water, or other suitable liquids may be added to the fuel source 102 in the feedstock preparation unit 104 to create slurry feedstock. In other embodiments, no liquid is added to the fuel source, thus yielding dry feedstock.

The feedstock may be passed to a gasifier 106 from the feedstock preparation unit 104. The gasifier 106 may convert the feedstock into a syngas, e.g., a combination of carbon monoxide and hydrogen. This conversion may be accomplished by subjecting the feedstock to a controlled amount of steam and oxygen at elevated pressures, e.g., from approximately 20 bar to 85 bar, and temperatures, e.g., approximately 700 degrees Celsius-1600 degrees Celsius, depending on the type of gasifier 106 utilized. The gasification process may include the feedstock undergoing a pyrolysis process, whereby the feedstock is heated. Temperatures inside the gasified 106 may range from approximately 150 degrees Celsius to 700 degrees Celsius during the pyrolysis process, depending on the fuel source 102 utilized to generate the feedstock. The heating of the feedstock during the pyrolysis process may generate a solid, (e.g., char), and residue gases, (e.g., carbon monoxide, hydrogen, and nitrogen). The char remaining from the feedstock from the pyrolysis process may only weigh up to approximately 30% of the weight of the original feedstock.

A combustion process may then occur in the gasifier 106. The combustion may include introducing oxygen to the char and residue gases. The char and residue gases may react with the oxygen to form carbon dioxide and carbon monoxide, which provides heat for the subsequent gasification reactions. The temperatures during the combustion process may range from approximately 700 degrees Celsius to 1600 degrees Celsius. Next, steam may be introduced into the gasifier 106 during a gasification step. The char may react with the carbon dioxide and steam to produce carbon monoxide and hydrogen at temperatures ranging from approximately 800 degrees Celsius to 1100 degrees Celsius. In essence, the gasifier utilizes steam and oxygen to allow some of the feedstock to be "burned" to produce carbon monoxide and energy, which drives a second reaction that converts further feedstock to hydrogen and additional carbon dioxide.

In this way, a resultant gas is manufactured by the gasifier 106. This resultant gas may include approximately 85% of carbon monoxide and hydrogen, as well as $CH_4$, HCl, HF, COS, $NH_3$, HCN, and $H_2S$ (based on the sulfur content of the feedstock). This resultant gas may be termed dirty syngas. The gasifier 106 may also generate waste, such as slag 108, which may be a wet ash material. This slag 108 may be removed from the gasifier 106 and disposed of, for example, as road base or as another building material. To clean the dirty syngas, a gas cleaning unit 110 may be utilized. The gas cleaning unit 110 may scrub the dirty syngas to remove the HCl, HF, COS, HCN, and $H_2S$ from the dirty syngas, which may include separation of sulfur 111 in a sulfur processor 112 by, for example, an acid gas removal process in the sulfur processor 112. Furthermore, the gas cleaning unit 110 may separate salts 113 from the dirty syngas via a water treatment unit 114 that may utilize water purification techniques to generate usable salts 113 from the dirty syngas. Subsequently, the gas from the gas cleaning unit 110 may include clean syngas, e.g., $NH_3$ (ammonia) and $CH_4$ (methane).

A gas processor 116 may be utilized to remove residual gas components 117 from the clean syngas such as, ammonia and methane, as well as methanol or any residual chemicals. However, removal of residual gas components 117 from the clean syngas is optional, since the clean syngas may be utilized as a fuel even when containing the residual gas components 117, e.g., tail gas. At this point, the clean syngas may include approximately 3% CO, approximately 55% $H_2$, and approximately 40% $CO_2$ and is substantially stripped of $H_2S$. This clean syngas may be transmitted to a combustor 120, e.g., a combustion chamber, of a gas turbine engine 118 as combustible fuel.

The IGCC system 100 may further include an air separation unit (ASU) 122. The ASU 122 may operate to separate air into component gases by, for example, distillation techniques. The ASU 122 may separate oxygen from the air supplied to it from a supplemental air compressor 123, and the ASU 122 may transfer the separated oxygen to the gasifier 106. Additionally the ASU 122 may transmit separated nitrogen to a diluent nitrogen (DGAN) compressor 124.

The DGAN compressor 124 may compress the nitrogen received from the ASU 122 at least to pressure levels equal to those in the combustor 120, so as not to interfere with the proper combustion of the syngas. Thus, once the DGAN compressor 124 has adequately compressed the nitrogen to a proper level, the DGAN compressor 124 may transmit the compressed nitrogen to the combustor 120 of the gas turbine engine 118.

As described previously, the compressed nitrogen may be transmitted from the DGAN compressor 124 to the combustor 120 of the gas turbine engine 118. The gas turbine engine 118 may include a turbine 130, a drive shaft 131 and a compressor 132, as well as the combustor 120. The combustor 120 may receive fuel, such as syngas, which may be injected under pressure from fuel nozzles. This fuel may be mixed with compressed air as well as compressed nitrogen from the DGAN compressor 124, and combusted within combustor 120. This combustion may create hot pressurized exhaust gases.

The combustor 120 may direct the exhaust gases towards an exhaust outlet of the turbine 130. As the exhaust gases from the combustor 120 pass through the turbine 130, the exhaust gases may force turbine blades in the turbine 130 to rotate the drive shaft 131 along an axis of the gas turbine engine 118. As illustrated, the drive shaft 131 is connected to various components of the gas turbine engine 118, including the compressor 132.

The drive shaft 131 may connect the turbine 130 to the compressor 132 to form a rotor. The compressor 132 may include blades coupled to the drive shaft 131. Thus, rotation of turbine blades in the turbine 130 may cause the drive shaft 131 connecting the turbine 130 to the compressor 132 to rotate blades within the compressor 132. This rotation of blades in the compressor 132 causes the compressor 132 to compress air received via an air intake in the compressor 132. The compressed air may then be fed to the combustor 120 and mixed with fuel and compressed nitrogen to allow for higher efficiency combustion. Drive shaft 131 may also be connected to load 134, which may be a stationary load, such as an electrical generator for producing electrical power, for example, in a power plant. Indeed, load 134 may be any suitable device that is powered by the rotational output of the gas turbine engine 118.

The IGCC system 100 also may include a steam turbine engine 136 and a heat recovery steam generation (HRSG) system 138. The steam turbine engine 136 may drive a second load 140. The second load 140 may also be an electrical generator for generating electrical power. However, both the first and second loads 134, 140 may be other types of loads capable of being driven by the gas turbine engine 118 and steam turbine engine 136. In addition, although the gas turbine engine 118 and steam turbine engine 136 may drive separate loads 134 and 140, as shown in the illustrated embodiment, the gas turbine engine 118 and steam turbine engine 136 may also be utilized in tandem to drive a single load via a single shaft. The specific configuration of the steam turbine engine 136, as well as the gas turbine engine 118, may be implementation-specific and may include any combination of sections.

The system 100 may also include the HRSG 138. Heated exhaust gas from the gas turbine engine 118 may be transported into the HRSG 138 and used to heat water and produce steam used to power the steam turbine engine 136. Exhaust from, for example, a low-pressure section of the steam turbine engine 136 may be directed into a condenser 142. The condenser 142 may utilize a cooling tower 128 to exchange heated water for chilled water. The cooling tower 128 acts to provide cool water to the condenser 142 to aid in condensing the steam transmitted to the condenser 142 from the steam turbine engine 136. Condensate from the condenser 142 may, in turn, be directed into the HRSG 138. Again, exhaust from the gas turbine engine 118 may also be directed into the HRSG 138 to heat the water from the condenser 142 and produce steam.

In combined cycle systems such as IGCC system 100, hot exhaust may flow from the gas turbine engine 118 and pass to the HRSG 138, where it may be used to generate high-pressure, high-temperature steam. The steam produced by the HRSG 138 may then be passed through the steam turbine engine 136 for power generation. In addition, the produced steam may also be supplied to any other processes where steam may be used, such as to the gasifier 106. The gas turbine engine 118 generation cycle is often referred to as the "topping cycle," whereas the steam turbine engine 136 generation cycle is often referred to as the "bottoming cycle." By combining these two cycles as illustrated in FIG. 1, the IGCC system 100 may lead to greater efficiencies in both cycles. In particular, exhaust heat from the topping cycle may be captured and used to generate steam for use in the bottoming cycle.

Figure 2:
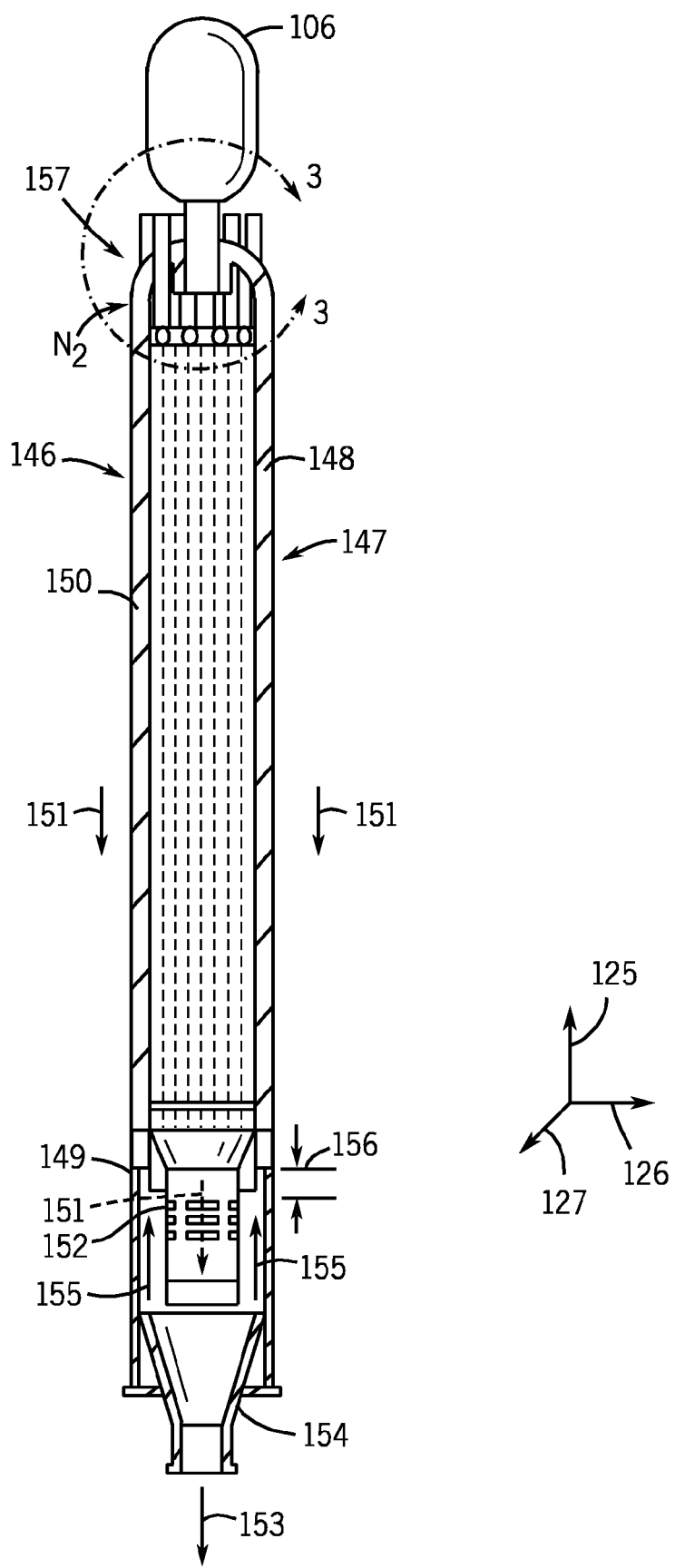
FIG. 2 is a cross-sectional side view of an embodiment of a radiant syngas cooler of FIG. 1.

FIG. 2 is a cross-sectional side view of an embodiment of a radiant syngas cooler (RSC) 146 for use with the IGCC system 100 of FIG. 1, which may benefit from the use of heat shielding techniques described below with respect to FIGS. 3-5. Various aspects of the RSC 146 may be described with reference to an axial direction or axis 125, a radial direction or axis 126, and a circumferential direction or axis 127. For example, the axis 125 corresponds to a longitudinal centerline or lengthwise direction, the axis 126 corresponds to a crosswise or radial direction relative to the longitudinal centerline, and the axis 127 corresponds to the circumferential direction about the longitudinal centerline. The syngas generated in the gasifier 106 may be mixed with slag, which may be removed prior to transmission of the syngas to the gas turbine engine 118. The RSC 146 may be useful for separating the slag from the syngas. Moreover, it may be beneficial to cool the syngas prior to transmission via the RSC 146.

The RSC 146 may also include a vessel 148. The vessel 148 may act as an enclosure for the RSC 146, enclosing both an upper region 147 of the RSC 146 as well as a lower region 149 of the RSC 146. The vessel 148 may also house cooling tubing 150, which may be in the upper region 147 of the RSC 146. The cooling tubing 150 may include a plurality of conduits along the radial axis 126 of the RSC 146, and may also run parallel in direction with the vessel 148 relative to the axial axis 125. Liquid, such as water, may flow through the tubing 150. Thus, the tubing 150 may act as a heat exchanger within the RSC 146, and may circulate the coolant to an external heat exchanger for removal of heat. The syngas generated in the gasifier 106 may generally flow in a downward manner parallel to the tubing 150 as indicated by arrows 151.

In this manner, the syngas may come in contact with the tubing 150 of the RSC 146 and the fluid flowing through the tubing 150 may act to cool the syngas as it travels through the RSC 146. One result of this cooling process may be the generation of steam in the tubing 150, which may then be transmitted to the heat recovery steam generator 138.

The RSC 146 may also include a conduit 152 in the lower region 149 of the RSC 146 that may aid in directing the cooled syngas and slag out of the RSC 146. For example, as the slag 108 exits the conduit 152, the slag 108 may flow in a generally downward direction 153 to exit the RSC 146 via a quench cone 154. In contrast, the cooled syngas may flow in a general upward direction 155 towards a transfer line 156 as the syngas exits the conduit 152. The transfer line 156 may be used to transmit the syngas to the gas turbine engine 118. Further description with respect to the cooling of the syngas in the RSC 146 will be described below.

Figure 3:
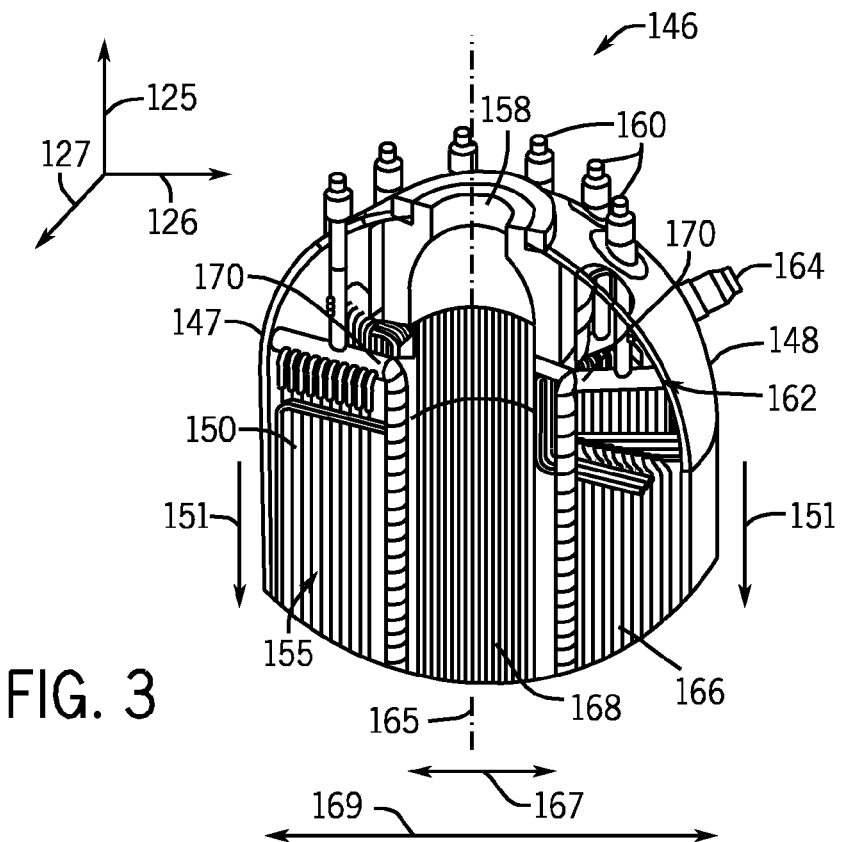
FIG. 3 is a cutaway perspective view of an uppermost portion of the radiant syngas cooler of FIG. 2 as shown within line 3-3 of FIG. 2.

FIG. 3 is a cutaway perspective view of an embodiment of an upper most portion 147 of the RSC 146, as shown within line 3-3 of FIG. 2, which may include heat shielding of the cooling tubes 150. As previously shown, the RSC 146 may include a vessel 148 as well cooling tubes 150. Additionally, the RSC 146 may incorporate the use of a throat 158. The throat 158 may be used to receive hot syngas as well as slag. The hot syngas and slag may flow downward 151 axially 125 through the throat 158 from the upper region 147 of the RSC 146 to the lower region 149 of the RSC 146. The RSC 146 may also include outlets 160 that each may be coupled to a header, such as a J-header 162 which may be defined as a conduit into which a number the cooling tubes open. As can be seen in FIG. 3, the headers 162 may attach to the cooling tubes 150. Additionally, the RSC 146 may include a coolant intake 164, as well as one or more heat shields 166, and a channel, or flue 168, for conveying the syngas and slag through the RSC 146.

As discussed previously, the hot syngas and slag may flow from the throat 158 through the channel 168 of the RSC 146. As the hot syngas and slag move downward through the RSC 146, the slag may drop in a fairly uniform manner, e.g., axially 125 downwards 151 through the flue 168. In contrast, the syngas, as it is in a gaseous state, may begin to flow axially 125 through the channel 168, however, the syngas may disperse radially 126 throughout the vessel 148 as well as flow axially 125 downwards 151 through the RSC 146. In this manner, the syngas, as it flows through the RSC 146, may interact with the cooling tubes 150.

As described above, the cooling tubes 150 may include a plurality of conduits that may run axially 125 parallel with the vessel 148. Liquid, such as water, may flow through the cooling tubes 150. This water may, for example, be supplied by a coolant intake 164. The fluid may pass downwards 151 through the coolant intake 164 into vessel adjacent tubing (not illustrated), to the bottom of the RSC 146, and then axially 125 upwards 155 through the cooling tubes 150 of the RSC 146. The fluid may flow from the cooling tubes 150 into the J-header 162, which as stated above, may operate as a fluid collection device. The fluid in the J-header 162 may then be transmitted out of the RSC 146 via the outlets 160.

The fluid passing through cooling tubes 150 may be, for example, water. The fluid may be, for example, approximately 630° Fahrenheit (F.). In another embodiment, the water may range from approximately 450° to 670° F., 400° to 750° F., 500° to 650° F., or higher, as process industry needs dictate. In contrast, the syngas passing through the flue 168 may range from approximately 800° and 2800° Fahrenheit. For example, when the RSC 146 is initialized, the syngas passing through the throat 158 to the flue 168 may be at a temperature of approximately 800° Fahrenheit. However, as the RSC continues to function, for example, after an initial start-up time, the syngas may be heated up to approximately 2000 to 2800° Fahrenheit. As the heated syngas interacts with the cooling tubes 150, it may transfer heat to both the fluid inside the cooling tubes 150, as well as the cooling tubes 150 themselves, thus cooling the syngas while generating a source of steam that may be utilized by, for example, the steam turbine engine 136.

Furthermore, as the syngas passes through the vessel 148 of the RSC 146, the syngas may be carrying residue from the gasification process, such as ash. This residue may be deposited on the cooling tubes 150 over time. These deposits on the cooling tube 150 may "foul" the cooling tubes 150 over time. That is, the materials deposited on the cooling tubes 150 may cause a film to develop on the outer surfaces of the cooling tubes 150. This film may operate to shield the cooling tubes 150 from the some of the temperatures of the syngas. This shielding may be beneficial, since direct exposure to temperatures of the syngas may cause the cooling fluid, for example, to boil or otherwise decompose, thus rendering the cooling tubes 150 ineffective for transmission of fluid to cool the syngas. Accordingly, this fouling of the cooling tubes 150 may operate to protect the cooling tubes 150 and to extend their usable life.

However, when initially operated, the cooling tubes 150 of the RSC 146 may have no shielding from exposure to the high temperature of the syngas because the cooling tubes 150 have not been in contact with the syngas for a long enough period of time to develop the deposit layer on the exterior of the cooling tubes. Thus, to allow the cooling tubes 150 to develop a suitable film via deposits, the gasification process may not be ramped-up to full capacity until a suitable amount of time has passed, whereby the deposit layer may sufficiently have built up on the cooling tubes 150. However, this delay may slow the overall generation of syngas. Accordingly, heat shields 166 may be utilized in the RSC 146 so that the start-up process may be accelerated without damage to the cooling tubes 150 via exposure to the syngas without a deposit layer.

The heat shields 166 may hang, for example, from one edge of the J-header 162. Each heat shield 166 may be comprised of Ceramic Matrix Composites (CMC), which may be a composition that includes both ceramic and non-ceramic materials. The CMC may include any suitable type of fiber reinforced ceramic material. For example, the CMC material may include fiber reinforced non-oxide ceramics, such as silicon carbide, silicon nitride, boron carbide, and aluminum nitride. The CMC material also may include fiber reinforced oxide matrix ceramics, such as alumina, silica, mullite, barium aluminosilicate, lithium aluminosilicate, or calcium aluminosilicate. Further, the CMC materials may include combinations of oxide and non-oxide ceramics, as well as other suitable CMC materials. For example, oxide ceramics may be used for certain components while non-oxide ceramics are used for other components. The CMC materials may include any suitable type of oxide or non-oxide reinforcing fibers, such as silicon carbide, carbon, glass, mullite, and alumina. Alternatively, ceramics such as silicon carbide, or metals or metal alloys, such iron or nickel based materials, may be used in place of the CMC's. A cermet, (e.g., a composite material composed of ceramic and metallic materials where the metal, such as nickel, molybdenum, and cobalt is used as a binder for an oxide, boride, carbide, or alumina) may also be used in place of the CMC's.

Regardless of the material used, the heat shields 166 may operate to provide protection of the cooling tubes 150 from direct exposure to the hot syngas upon startup before fouling may occur to aid in the protection of the cooling tubes 150. That is, the one or more heat shields 166 may act as a barrier to block the syngas from directly contacting the cooling tubes 150 when it immediately comes through the throat 158 of the RSC 146.

The heat shield 166 may be attached to one end of the J-header 162. The attachment may be done via adhesion, via welding, via fasteners, or via any other suitable mount, as well as via hooks hooks, via hinges, or any other suitable hanging mount. Furthermore, the J-header 162 may be aligned such that one end of the J-header 162 is adjacent to the vessel 148 while the other end of the J-header 162 may point inward to the axial 125 centerline 165 of the RSC 146. Furthermore, more than one J-header 162 may be utilized, and each may be utilized circumferentially 127 around the RSC 146. In this manner, the J-headers 162 form a diameter $D_1$ 167 approximately the size of the diameter of the flue 168, and smaller in size than a diameter $D_2$ 169 of the RSC 146. A heat shield 166 may be attached to each J-header 162 along the inner portion 170 of each J-header 162 so as to protect one or more cooling tubes 150 radially 126 closest to the diameter $D_1$ 167 in the RSC 146 by blocking the direct flow of syngas to the cooling tubes 150. Additionally, multiple heat shields 166 may be attached to each J-header 162 for protection of multiple cooling tubes 150 or multiple groups of cooling tubes 150 attached to each J-header 162.

The heat shield 166 may be, for example, partially cylindrical in shape. The heat shield 166 may curve circumferentially 127 about the cooling tube 150 of each J-header 162 closest to the centerline 165. Accordingly, the heat shield 166 may be sized such that the heat shield 166 covers the cooling tube 150 closest to the centerline 165 for each J-header 162. The heat shield 166 may also be sized such that it may be operably attached to the edge of the J-header 162. The heat shield 166 may also be annular in shape, and may include a single heat shield 166 in the form of an annular sleeve that may be circumferentially 127 attached along the inner portion 170 of the all of the J-headers 162.

In one embodiment, the heat shield 166 may be configured to be "used up" during the initial stages of gasification by the RSC 146. That is, the material or materials utilized to manufacture the heat shield 166 may be selected such that the heat shield is continuously eroded by the hot syngas, specifically, for example, by either the heat of the syngas and/or by elements of sulfur and chlorides that exist in the syngas. Thus, the heat shield 166 may be designed to corrode over a set period of time, such as one hour, one day, one week, one month, one year, five years, ten years, or any time therebetween, based on the materials used to form the heat shield 166 and the amount of material used in producing the heat shield 166. During the corrosion of the heat shield 166, the cooling tubes 150 may foul, as previously discussed above, such that upon full corrosion of the heat shield 166, the cooling tubes 150 may be sufficiently protected from the heat of the syngas via the fouling so as to prevent damage to the cooling tubes 150 via direct contact with the syngas as it enters the flue 168.

Prior to being completely corroded, the heat shield 166 may resist, (e.g., block the heated syngas from the innermost cooling tubes 150) syngas at temperatures up to approximately 2800° Fahrenheit from directly contacting the cooling tubes 150 for short periods of time, for example, up to approximately 1 to 30 minutes. Alternatively, the heat shield 166 may resist other temperatures of the syngas, e.g., up to approximately 1000° Fahrenheit, 1200° Fahrenheit, 1400° Fahrenheit, 1600° Fahrenheit, 1800° Fahrenheit, 2000° Fahrenheit, 2200° Fahrenheit, 2400° Fahrenheit, or 2600° Fahrenheit. For example, the heat shield 166 may resist temperatures up to approximately 2000° Fahrenheit from directly contacting the cooling tubes 150 for longer periods of time, for example, up to approximately 1 to 24 hours. The heat shield 166 may block at least approximately 5, 10, 15, 20, 25, 30, 35, 40, 45, 50, 55, 60, 65, 70, 75, or 80 percent of the temperature of the syngas from directly contacting the cooling tubes 150. In another example, the heat shield may provide approximately a 100°, 200°, 300°, 400°, or 500° Fahrenheit drop in temperature from one side of the heat shield 166 to the other side of the heat shield 166.

The heat shield 166 may be designed to be removed from the RSC 146 during, for example a plant outage, or after the cooling tubes 150 have been appropriately fouled. Alternatively, the heat shield 166 may be comprised of material that allows the heat shield 166 to remain in the RSC 146 until such time as the remaining components of the RSC 146 are ready for replacement. It should be noted that although the heat shield described above is described in conjunction with an RSC 146, it is envisioned that heat shields 166 could be applied to other embodiments that include high incoming gas temperatures and/or other heat exchangers.

Figure 4:
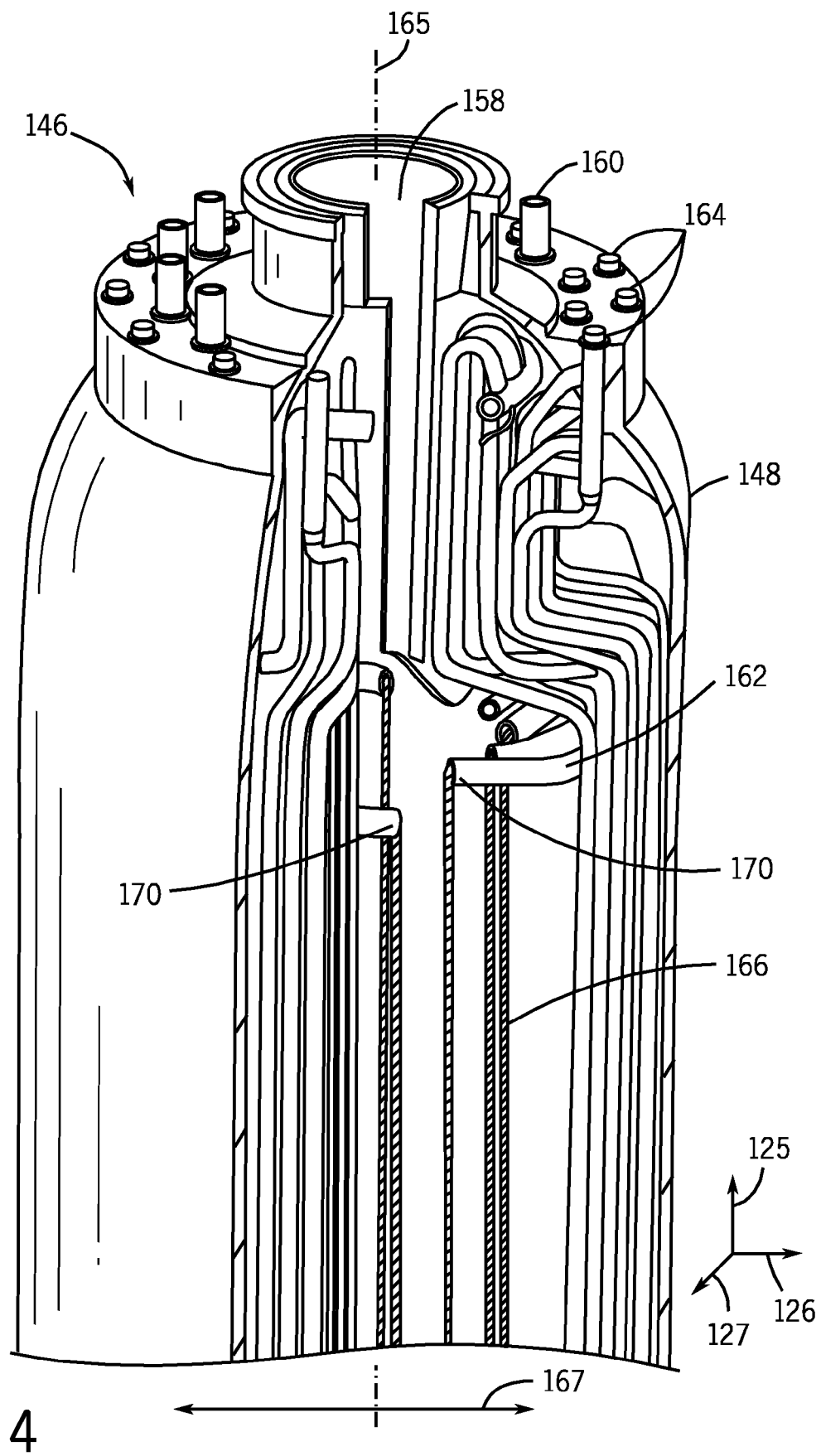
FIG. 4 is another cutaway perspective view of the uppermost portion of the radiant syngas cooler of FIG. 2.

FIG. 4 is a cutaway perspective view of a second embodiment of the RSC 146. As described above, the RSC 146 may include a throat 158, outlets 160, a coolant intake 164, vessel 148, J-headers 162, and heat shields 166. As can be seen in FIG. 4, a plurality of J-headers 162 may be utilized in conjunction with the RSC 146. Furthermore, as illustrated in FIG. 4, the inner portion 170 of each J-header 162 may form a ring of diameter $D_1$ 167. As may be seen in FIG. 4, a single heat shield 166 may be affixed to the inner portion 170 of the J-header 162 to shield the cooling tubes 150 of each J-header closest to the axial 125 centerline 165 of the RSC 146. Moreover, the J-headers 162 may be disposed circumferentially 127 about the RSC 146 at an angle of between approximately 0° and 180° relative to an outer circumference of the vessel 148. In one embodiment, the J-headers 162 may be disposed circumferentially 127 about the RSC 146 at right angles relative to an outer circumference of the vessel 148. Alternatively, the J-headers 162 may be disposed circumferentially 127 about the RSC 146 at approximately 10°, 20°, 30°, 40°, 50°, 60°, 70°, or 80° relative to an outer circumference of the vessel 148. Regardless of the arrangement of the J-headers 162, a heat shield 166 may be affixed to the inner portion 170 of each J-header 162. It is envisioned, that these heat shields 166 may operate as described above with respect to FIG. 3.

Figure 5:
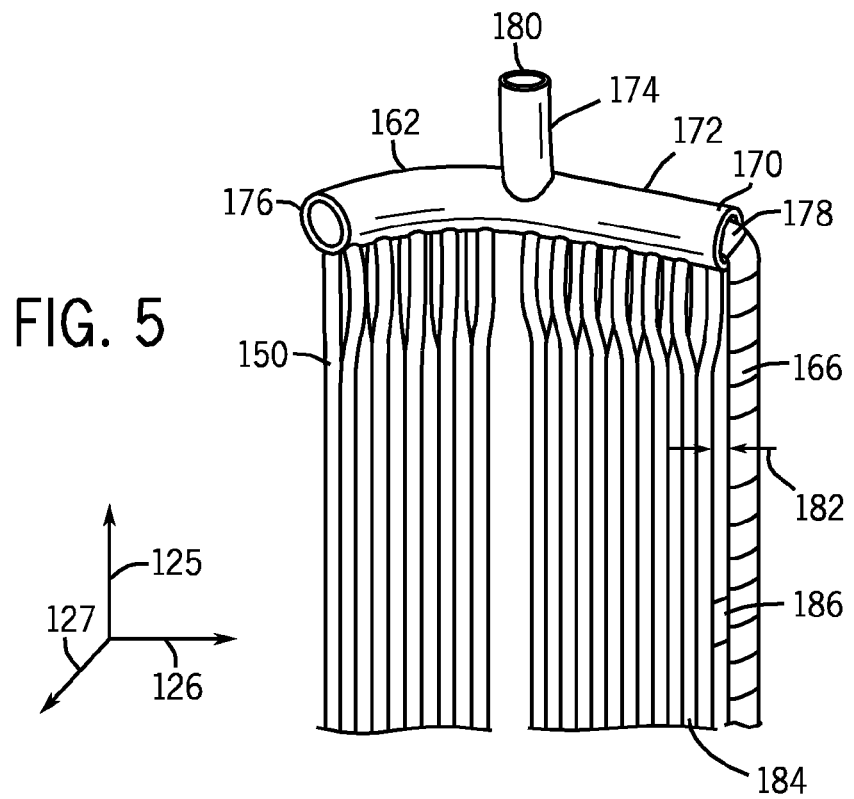
FIG. 5 is a cutaway perspective view of an embodiment of a J-header for use in conjunction with the radiant syngas cooler of FIG. 2.

FIG. 5 illustrates a single J-header 162 that includes cooling tubes 150, a heat shield 166, and a spacer 186. As may be seen in FIG. 5, the J-header 162 may include tubing that extends both axially 125 and radially 126. The radial 126 portion 172 of the J-header 162 may be, for example, approximately four times the length of the axial 125 portion 174 of the J-header 162. Furthermore, the radial 126 portion 172 of the J-header 162 may be curved. In one embodiment, the J-header 162 may be curved at an angle of approximately 15°. However, other embodiments with more, or less, curvature, including no curvature as to the radial 126 portion 172 of the J-header 162, are envisioned. The J-header 162 may be closed at each radial 126 end 176 and 178, and is open at the axial 125 end 180. Furthermore, the J-header 162 may be hollow. This configuration may allow for a fluid mix of liquid and steam to pass from the cooling tubes 150 through the J-header 162, while exiting the J-header 162 at the vertical end.

As can be seen in FIG. 5, the heat shield 166 may be affixed to one radial 126 end 178 of the J-header 162. Furthermore, as may be seen in FIG. 5, the heat shield 166 may be semi-cylindrical, (e.g., from 1° to 10° of a cylinder) and may hang at a distance 182 from the single cooling tube 184 nearest to the radial 126 end 178 of the J-header 162. The distance 182 may be approximately equal to the diameter of the single cooling tube 184. However, in other embodiments, the heat shield 166 may be located at a greater or lesser distance from the cooling tubes 150 than the diameter of the single cooling tube 184, as described above. Additionally, the heat shield 166 may hang in the flue 168 of the RSC 146 so as to prevent direct contact between the hot syngas and the cooling tubes 150 during initial and/or subsequent startup of the RSC 146. Accordingly, only the radial 126 end 178 of the J-header 162 closest to the axial 125 centerline 165 of the RSC 146 may attach to the heat shield 166.

As described above, the heat shield 166 may hang at a distance 182 from the single cooling tube 184, which may be the cooling tube 150 closest to the axial 125 centerline 165 of the RSC 146. FIG. 5 further illustrates a spacer 186. This spacer 186 may operate to prevent excessive rattling and/or movement of the heat shield 166 in relation to the cooling tubes 150. Furthermore, while one spacer 186 is illustrated, more than one spacer 186 may be utilized in conjunction with the cooling tubes 150 and heat shield 166. The spacer 186, may be affixed to either the single cooling tube 184, the heat shield 166, and/or to both. For example, the spacer 186 may be welded, bolted, adhered, or affixed by any other method to either one or both of the single cooling tube 184, and/or the heat shield 166. The spacer 186 may be comprised of a ceramic matrix composite, metal, or any other heat resistant substance. In one embodiment the spacer 186 may be comprised of material similar to that utilized in the cooling tubes 150. In another embodiment, the spacer 186 may be comprised of material utilized for the heat shield 166. The spacer 186 may be coaxial or concentric with the heat shield 166. It should be noted that the placement of the one or more spacers 186 may be determined based on the overall length of the heat shields 166, as described below.

Figure 6:
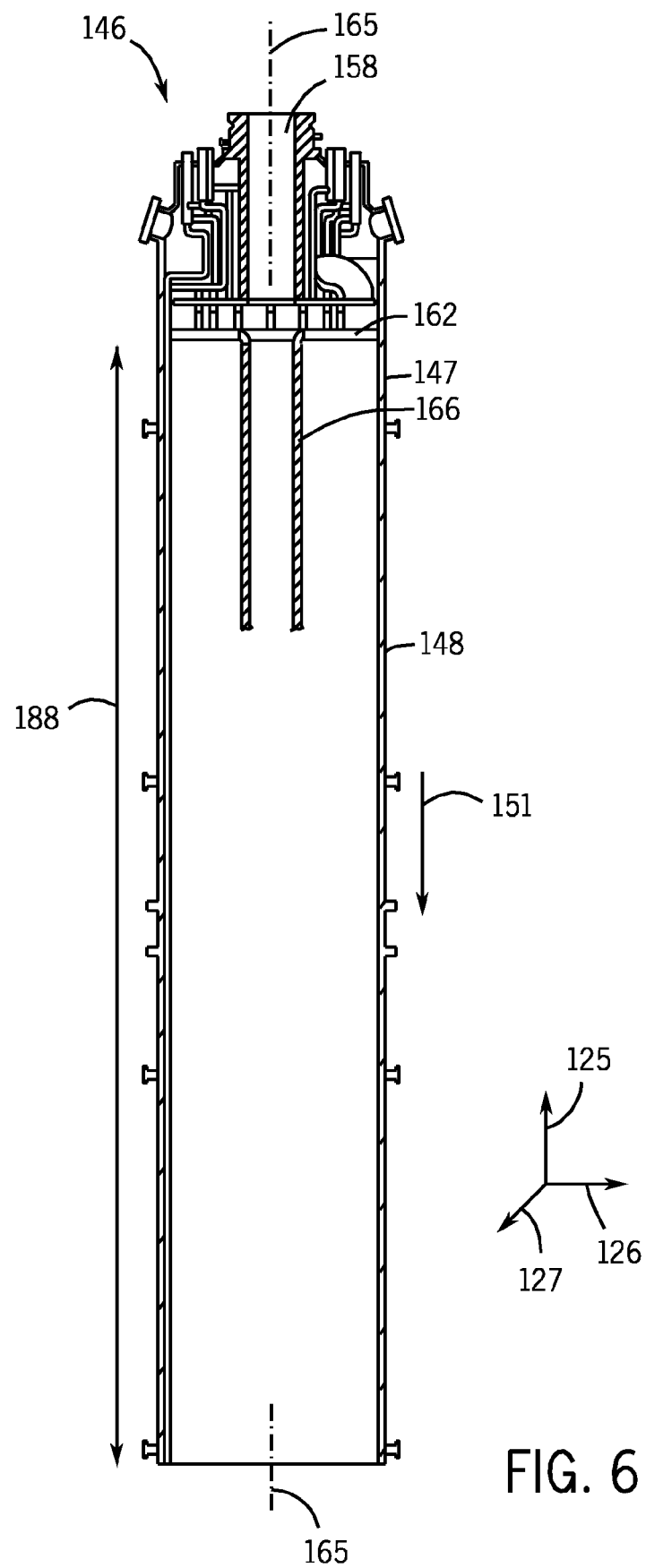
FIG. 6 is a cross-sectional side view of an embodiment of the radiant syngas cooler of FIG. 2 that includes a plurality of heat shields.

FIG. 6 is a cross-sectional side view of an embodiment of the RSC 146. As can be seen in FIG. 6, the heat shields 166 of the RSC 146 may be sized such that the heat shields 166 may not extend through the length L 188 of the RSC 146. That is, the length of the heat shields 166 may extend between partial coverage (e.g., less than the entire length) of the coolant tubes 150 to full coverage (e.g., the full length) of the coolant tubes 150 disposed along a gas passage of length L 188.

Indeed, the heat shields 166 may extend only approximately ¼ of the length L 188 of the cooling tubes 150 utilized in the RSC 146. In other embodiments, the heat shields 166 may extend approximately between 1% and 100% of the length L 188 of the cooling tubes 150 hanging from the J-header 162. In another embodiment, the heat shields 166 may extend between approximately 10% and 70% of the length L 188 of the cooling tubes 150, or alternatively between approximately 20% and 50% or 30% and 40% of the length L 188 of the cooling tubes 150. In a further embodiment, the heat shields 166 may extend approximately 10%, 20%, 30%, 40%, 50%, 60%, 70%, 80%, or 90% of the length L 188 of the cooling tubes 150 to thermally shield the cooling tubes 150 in an upstream region of flow of the heated syngas fluid.

As described above, the length of the heat shield 166 may not need to extend fully to the length L 188 of the cooling tubes 150 because the syngas, at its highest temperature, may be encountered by the cooling tubes 150 in the upper region 147 of the RSC 146. This may be due to the syngas contacting the cooling tubes 150 carrying cooling fluid as the syngas diffuses throughout the vessel 148. As the syngas disperses, it is cooled, leading to a lowered risk of the hot syngas damaging the cooling tubes 150 via excess temperatures. Therefore, as the gas continues its downward path 151, it is cooled via the cooling tubes 150 and, accordingly, the need for the heat shield 166 is lessened. Thus, the heat shield 166 may be utilized at the highest intensity point of temperature of the syngas, that is, where the cooling tubes 150 begin hanging from the J-header 162 of the upper region 147 of the RSC 146. Furthermore, the illustrated configuration of the heat shield 166 may operate to spread the temperature of the radiant syngas throughout the cooling tubes 150, instead of being focused on the cooling tubes 150 closest to the axial 125 centerline 165 of the RSC 146 closest to the J-headers 162.

In a second embodiment, the heat shield 166, as illustrated in FIG. 6, may not be affixed to each J-header 162. Instead, materials previously discussed as being utilized for construction of the heat shield 166 may be directly applied to the cooling tubes 150 as a coating. For example, the heat shield 166 may be applied via spray coating, dipping, brushing, or the like. In one embodiment, the heat shielding materials may be applied, for example, to the cooling tubes 150 for each J-header 162 radially 126 closest to the axial 125 centerline 165 of the RSC 146. Alternatively, the applied coating may be applied to all cooling tubes 150 of the RCS 146, where the cooling tubes 150 radially 126 closest to the axial 125 centerline 165 of the RSC 146 may receive a thicker coating than the cooling tubes 150 radially 126 farther from the axial 125 centerline 165 of the RSC 146. That is, the length of the coating may extend between partial coverage (e.g., less than the entire length) of the coolant tubes 150 to full coverage (e.g., the full length) of the coolant tubes 150 disposed along a gas passage of length L 188 at, for example, varying thicknesses.

Moreover, the applied material may, for example, have a greater thickness axially 125 closer to the J-header 162 and the material may be applied to the cooling tubes 150 with a lessening thickness as the axial 125 distance from the J-header 162 increases. In one embodiment, the coating may be applied to the cooling tubes 150 at a length of approximately ¼ of the entire length L 188 of the cooling tubes 150. However, it is envisioned that the coating material may be applied to the cooling tubes 150 from approximately 1% to 100% of the length L 188 of the cooling tubes 150. In another embodiment, the coating may extend between approximately 10% and 70% of the length L 188 of the cooling tubes 150, or alternatively between approximately 20% and 50% or 30% and 40% of the length L 188 of the cooling tubes 150. In a further embodiment, the coating may extend approximately 10%, 20%, 30%, 40%, 50%, 60%, 70%, 80%, or 90% of the length L 188 of the cooling tubes 150. Furthermore, the coating may include a single material, such as a CMC, a ceramic, or a metal. The coating may, alternatively, include a composition of two or more heat resistant materials. The coating material may be the same as described above with respect to the materials utilized in the heat shield 166.

As described above, a heat resistant coating, or layer, may be directly applied to the cooling tubes 150. Through utilization of this coating on the cooling tubes 150, the critical heat flux that may impact untreated cooling tubes 150 may be minimized. Furthermore, this coating of the cooling tubes 150 may be, in a manner similar to that described above with regard to the heat shield 166, corroded over time through contact with the syngas. Furthermore, as the coating is corroded, fouling may occur in place of the coating layer to protect the cooling tubes 150 from the critical heat flux that may be caused by direct exposure to the syngas. In this manner, either through the use of a heat shield 166 and/or via a coating of the cooling tubes 150, the gasification system may ramp up to a full load more quickly upon initialization because fouling of the cooling tubes 150 may not have to occur upon initialization due to the shielding described above of the cooling tubes 150 from high heat flux that may cause damage to the cooling tubes 150.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
a gasification cooling system comprising:
a heat exchanger comprising a coolant circuit and a gas passage, wherein the gas passage comprises an inlet, an outlet, and an expanded portion between the inlet and the outlet in an axial direction of the heat exchanger, and the coolant circuit comprises coolant tubes disposed along the gas passage between the inlet and the outlet;
a first header fluidly coupled to the coolant tubes, wherein the header is disposed in the gas passage between the inlet and the expanded portion in a radial direction of the heat exchanger; and
a heat shield disposed at the inlet of the gas passage between a central gas flow region of the gas passage and the inner wall of the coolant circuit, wherein the heat shield extends partially along a length of the coolant tubes in the axial direction and the heat shield is coupled to the header in the radial direction.

2. The system of claim 1, wherein the heat shield comprises a protective coating directly on the coolant tubes.

3. The system of claim 2, wherein the protective coating comprises a ceramic material or a ceramic matrix composite material.

4. The system of claim 2, wherein the protective coating has a thickness that decreases in a downstream direction from the inlet toward the outlet.

5. The system of claim 1, wherein the heat shield comprises an annular sleeve separate from the tubes.

6. The system of claim 5, wherein the annular sleeve hangs from the header between the inlet and the expanded portion.

7. The system of claim 5, wherein the annular sleeve comprises a ceramic, a ceramic matrix composite, a metal, a cermet, or a combination thereof.

8. The system of claim 5, comprising a spacer between the annular sleeve and the cooling tubes.

9. The system of claim 5, wherein the heat shield has a limited lifetime based at least partially on a corrosion rate when exposed to a heated flow in the heat exchanger, and the heat shield is configured to be replaced or supplemented by deposits onto the cooling tubes as a result of operation of the gasification cooling system.

10. The system of claim 1, wherein the gasification cooling system is configured to be coupled to a gasifier.

11. The system of claim 1, wherein the heat shield has a limited lifetime based at least partially on a corrosion rate, and the heat shield is configured to corrode by heat, sulfur, or chlorides, or any combination thereof.

12. The system of claim 1, comprising a second header disposed in the gas passage between the inlet and the expanded portion in a circumferential direction of the heat exchanger from the first header.

* * * * *